Patented Feb. 11, 1941

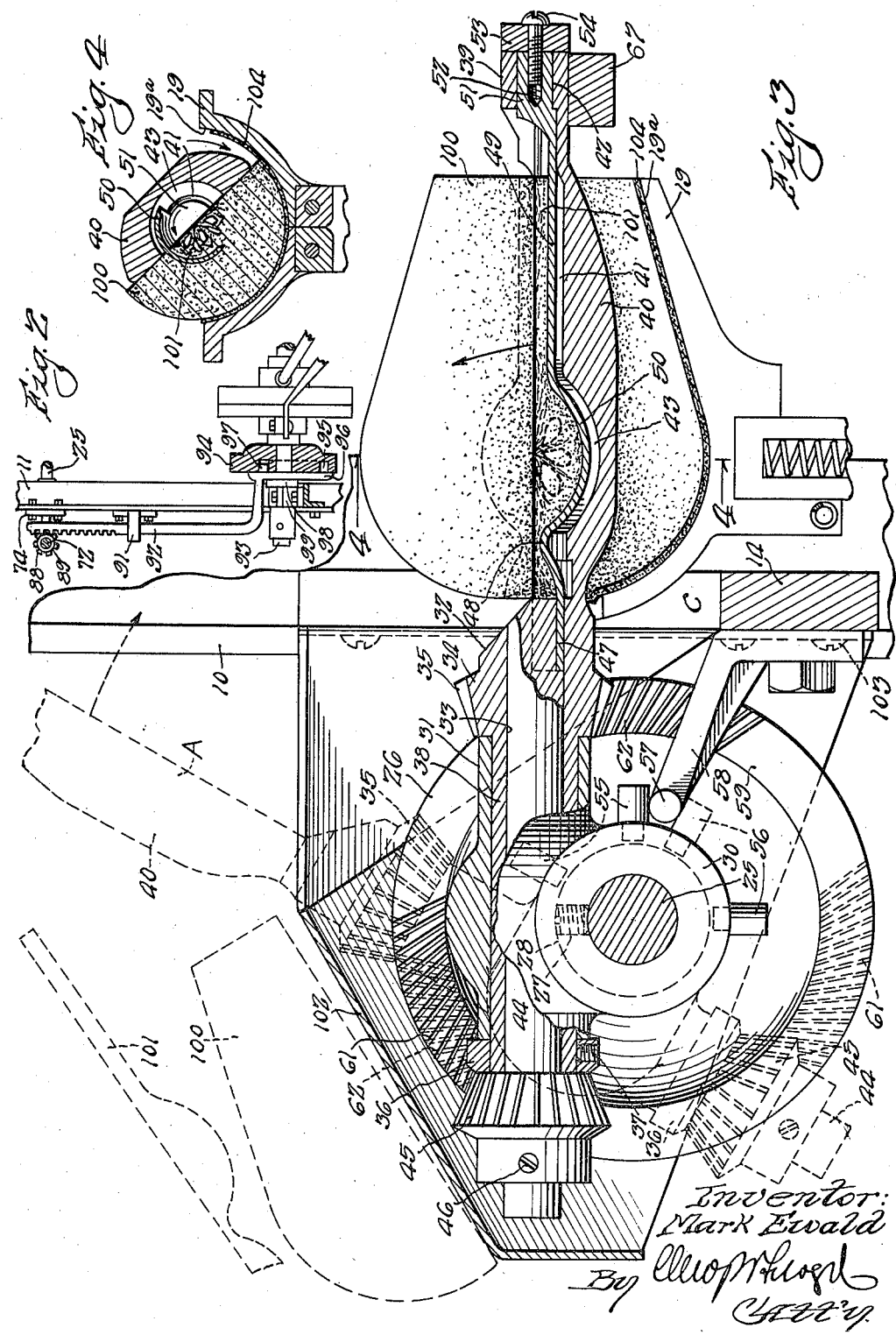

2,231,002

UNITED STATES PATENT OFFICE 2,231,002

FRUIT CUTTING APPARATUS

Mark Ewald, Olympia, Wash., assignor to Special Equipment Company, Portland, Oreg., a corporation of Oregon Application May 28, 1932, Serial No. 614,062
Renewed June 8, 1939

27 Claims. (Cl. 146—52)

The present invention has to do with a machine for treating fruit and more particularly relates to an improved mechanism for removing the central seed-containing section from the fruit.

An object of the present invention is to provide a device of extremely rugged construction for removing the central seed-containing section from a fruit that has been halved.

Another object of the present invention is to provide mechanism for cutting the central seed-containing section, which mechanism is readily attachable as a unit to existing machines for peeling fruit.

Still another object of the present invention is to provide a device complementary of a peeling machine and accomplishing by continuous operation the feat of removing the core from a fruit and subsequently discharging the cored fruit from the machine.

Other objects of my invention are to provide a device for removing or severing the central seed-containing section from fruit, and particularly half fruits, wherein mechanism operates to remove the central seed-containing section from the half fruit and then to remove both the half fruit and the section so removed from the half fruit from the mechanism which holds the half fruit during the cutting operation; to provide a device for removing the central seed-containing section from the half fruit wherein such section removing operation is accomplished by moving the fruit and cutting the fruit while the fruit is moving; to provide a device for moving the central seed-containing section from the half fruit, which both moves the half fruit and the cutting mechanism, for the purpose of more quickly and more effectively effecting the cutting or severing of the central seed-containing section from the half fruit; to provide a device for removing the central seed-containing section of a half fruit wherein the half fruit is turned about an axis substantially parallel to the cut face of the half fruit during the cutting operation thereof; to provide a coring device, particularly for coring half pears, wherein the pear is turned about its stem axis during the coring of the fruit to expedite and facilitate the same; to provide a device for removing the central seed-containing section of a half fruit wherein the half fruit is turnably held and wherein means is provided for turning the half fruit as it is cut, not only for the purpose of assisting in the removal of the seed-containing portion, but also for positioning the half fruit so cut so that it may be discharged from the holding means; to provide means for removing the central seed-containing portion of a half fruit cooperating with a recessed, substantially cup-shaped fruit holder with means for substantially inverting the half fruit in the cup to position it substantially outside of the cup, and wherein the means for removing the central seed-containing section operates in conjunction with the turning means to cut the fruit during the turning operation; to provide a device of the foregoing character wherein the means for turning the fruit also functions bodily to discharge the fruit and/or the severed central seed-containing section with the fruit from the substantially cup-shaped fruit holder; and to provide the foregoing type of machine in combination with a turret provided with a plurality of spaced-apart fruit holders which transport a half fruit, including its peel severed therefrom, into position whereby instrumentalities operate upon the half fruit to remove the central seed-containing section and to remove the fruit so cut with its severed seed-containing section from the holding means, leaving the peel in the holding means for subsequent removal therefrom.

These objects, and such other objects as hereinafter appear, are obtained by the novel construction, unique combination, and improved arrangement of the several elements constituting the invention, one embodiment of which is shown in the accompanying drawings, in which:

Figure 2 is an elevational view of the driving means for the coring device showing a portion thereof in cross section and taken along the line 2—2 of Figure 1;

Figure 3 is a vertical sectional view taken along the line 3—3 of Figure 1; and

Figure 4 is a lateral section passing conjointly through one of the fruit cups of the machine and an associated coring element as indicated by line 4—4 of Figure 3, and illustrating the relative movement of the parts in said element.

Like reference characters will be used to indicate similar parts throughout the description and in the accompanying drawings hereby made a part of this specification.

Figure 1:
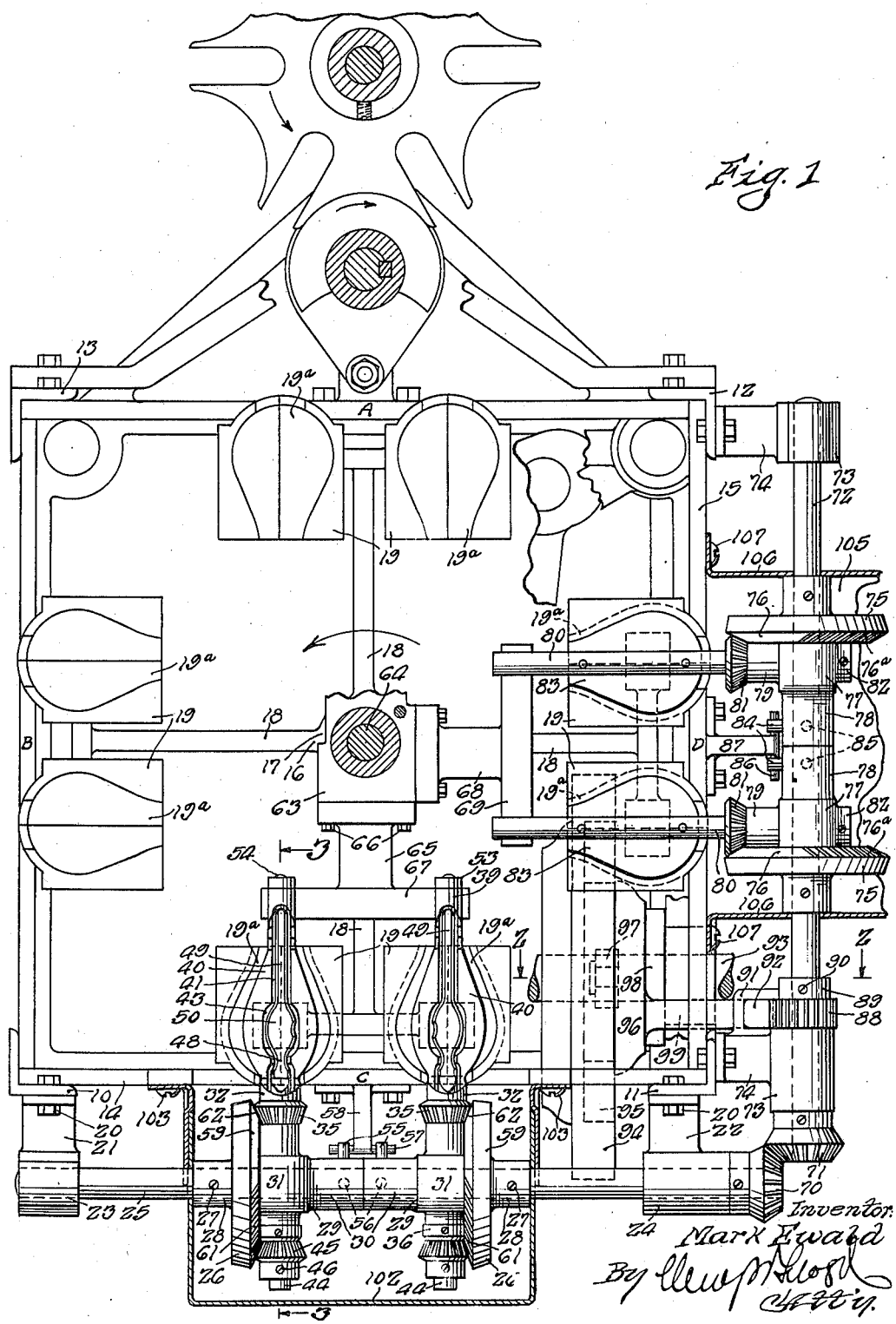
Figure 1 is an orthographic projection of a machine embodying the invention as taken from above.

In Figure 1 four upright angle posts 10, 11, 12 and 13 are shown. These constitute generally a frame for the machine. Cross members 14 and 15 of the frame coact as supporting means for the coring and scavenging mechanisms. The machine has a turret 16 comprising a central bearing block 17 having radiating quadrantly therefrom horizontal arms 18, the latter of which have fruit cups 19 at their extended ends. The turret 16 is disposed to rotate in an anti-clockwise direction when viewed from above.

Progressively the turret acts to intermittently advance each pair of receptacles 19 to stations identified by the letters A, B, C, and D in the order given. Anterior to reaching station A, a fruit has been divided longitudinally into halves. At station A, a half of the fruit is introduced into each receptacle 19 with its flat plane exposed upwardly. A subsequent shift of the turret delivers the cups holding the halved fruit to station B where a paring operation is performed, the pulp being separated from the epidermis. This paring operation having been performed, the cups 19 and contents are advanced to position C where the core is removed from the fruit and the fruit and core removed from the receptacle by the apparatus about to be described, the functions of which will be explained in detail. The cycle of operations is completed after the fruit receptacles are momentarily positioned at station D where the epidermis remaining in the cup is removed therefrom preparatory to a return of the cups to station A.

With the foregoing perspective in mind, Figures 1 and 3 should be read conjointly. Figure 3 illustrates in detail the parts of the core removing instrumentality. Secured to frame components 10 and 11 by fastening means 20 are standards 21 and 22 terminating in bearing blocks 23 and 24 respectively. The bearing blocks 23 and 24 provide journals for a shaft 25. Inward of the ends of the shaft 25, gear wheels 26 are keyed or otherwise fabricated thereto for rotating therewith. Movement of the gears 26 axially of the shaft 25 is prevented by set screws 27 impinging shaft 25 and threaded into apertures provided in flanges 28 extraneous to the gears.

Frictional drive couplings or boxing 29 are rotatively positioned on shaft 25 intermediate gears 26 by means of bearings 30. A second bearing 31 in each block 29 is normal to and above the first mentioned bearing 30. Journaled in each bearing 31 is a specially shaped spindle 32 with a longitudinal bearing 33 within the journaled portion thereof.

A shoulder 34 circumscribing member 32 has cut thereon teeth to effect a pinion 35 integral with the spindle. The spindle or stem 32 is contained within bearing 31 and against lateral movement through the agency of the shoulder 34 at the forward end and a collar 36 at its opposite end. A set screw 37 insures a fixed position for collar 36.

The forward end of the stem or support 32 is provided with means for contacting the cut face of the half fruit to hold the half fruit between two relatively non-yielding surfaces during the severance of the seed-containing section of the half fruit. In addition, this means likewise performs a function of shifting the half fruit in its cup or primary holding means for the purpose of discharging it therefrom to a position inverted with respect to its original position in the cup and from which inverted position it may be easily discharged from the cup to a remote point. In the present instance, the means which contacts the cut face of the half fruit for holding it during severance against the inner walls of the cup is made turnable relatively to the cup, not only for the purpose of expediting the seed severing operation, but also for the purpose of discharging the half fruit from the cup. In the specific construction illustrated, as this fruit contacting member rotates, preferably axially of the stem axis of the fruit, such as a half pear, the seed severing cutter rotates on the same axis, but preferably in an opposite direction, whereby to sever the seed section from the half fruit in one-half the time or in one-half the arcuate movement of the cutting mechanism, as compared with a construction in which the half fruit remains stationary during the turning of the seed severing cutter. In the illustrated embodiment, the stem 32 extends generally as a flat member or pad 40 depending below the mutual axis of shank 38 and a boss 39.

In the present disclosure, the element 40 is termed a pad, designating thereby any type of means adapted to contact the cut face of the half fruit on opposite sides of the seed-containing section and functioning effectively to hold the half fruit relatively to the cup mechanism during the severing operation, and/or to turn the half fruit out of the cup for the purpose above set forth. The upper face of the aforementioned dependent section 40 is flat and describes a perimeter of contour similar to the flat face exposed by a pear halved longitudinally.

Cast within the flat upper side of element 40 is a semicircular cavity or opening 41 originated about the axis of the spindle 32, and transgressing the length of the exposed flat face to enjoin the bearing 33 and the bearing 42 in boss 39. An enlarged section 43 of the cavity 41 occurs at a point substantially central of the widest portion of element 40.

In floating bearing 33 is a shaft 44 carrying a pinion 45 locked thereto by a key 46. A surface depression is formed at the foremost end of shaft 44 to receive the end of a curved blade 47 which is solidly incorporated thereto by any effective means. The cutter 47 which is of semicircular transverse cross section conforms a reduced section 48 and a straight shell-like section 49.

Intermediate the parts 48 and 49, the blade is shaped to provide a bulging effect proscribing an arcuate cutting portion 50 shaped substantially in contour to encompass substantially one-half of the portion of the core or pit to be removed, which bulging portion registers with pocket 43 of the spindle. A lug 51 is provided for rotating in bearing 42. The coring spoon intermediate of its longer axis is provided with an enlarged section the purpose of which is to remove the core proper, while the two sections on the opposite sides thereof are formed integrally therewith, one being of smaller radius with parallel sides and being arranged to sever the strings which extend between the core proper and the stem end of the fruit and the other being shorter and being of larger radius to remove the blossom end of the fruit. The intermediate portion 48 is of restricted cross section so as to remove the minimum amount of flesh thereat, since this flesh is edible and has no strings or other hard portions which need to be removed. It will thus be seen that applicant has provided a coring blade which may be described generally as being half cylindrical in cross section but which is of varying radii along its length so as to conform to the varying cross sections of the seed section to be severed from the half fruit. This knife has an axis coincident with the stem axis of the half fruit. The knife has a minimum tendency to tear or bruise the fruit and is readily adaptable for use with the auxiliary fruit holding mechanism herein specifically termed a holding pad. Said lug, containing a tapped well 52, is a journal member for the foremost end of blade 47. A cap 53 secured to the end of journal 51 by fastening means 54 coacts with pinion 45 as an abutment for the end thrust of the assembly. The edges of the coring knife 47 are sharpened coextensive with its length.

The term "coring" in the present application is to be interpreted as an operation for removing the central seed-containing sections of the half fruit and is not limited to a specific coring operation unless the claims otherwise so limit the construction.

Claims to the specific formation of the seed-severing knife are covered by my Patent No. 2,072,103, issued March 2, 1937, and which patent contains process claims, and are also covered by my pending application Serial No. 746,952, filed October 5, 1934, containing claims drawn to the coring mechanism per se.

Other claims drawn to the process of forming the severing cut at the seed section part of the half fruit are contained in my pending application Serial No. 187,690, filed January 29, 1938, which application forms a division of the present application.

Extending radially from sleeves 30 are lugs 55. These lie in a direction parallel to the operating axis of the coring instrumentality. Similar lugs 56 are positioned on bearing members 30, ninety degrees from and below the first mentioned lugs. The lugs 55 and 56 serve as stops to alternately abut a stem 57 presented in their arcuate path of travel, said stem being supported by a bracket 58 bolted to horizontal frame bar 14.

On the opposed annular beveled faces 59 of gear wheels 26 are scored two independent arcs 61 and 62 of gear teeth. Sleeves 30 are contiguously disposed and are of a length to position pinions 35 and 45 in mesh with gear trains 62 and 61 respectively.

Stationarily positioned at the center of the machine proper is a block 63 about a vertical shaft 64 which may rotate therein. To block 63 a bracket 65 is secured by studs 66. A cross bar 67 at the end of bracket 65 provides a rest for spindles 32. Similarly disposed on block 63 and arranged to extend horizontally therefrom at an angle ninety degrees from the first mentioned bracket is a second bracket 68 bearing a cross arm 69.

The frictional engagement of shaft 44 with bearing 33 is such that the pinion 45 and shoulder 34 do not rotate during certain operations. Therefore, the fruit and core and coring instrumentality are carried upwardly and about shaft 25 approximately ninety degrees until stop 56 strikes stop 57, all as will be hereinafter more fully pointed out.

At the right end of shaft 25 a pinion 70 is fixed. Said pinion 70 engages a like pinion 71, the rotating axis of the latter being ninety degrees to the former. The pinion 71 is mounted on a shaft 72. The rotating member 72 is journaled in bearings 75 provided by short arms 74 which are bolted to legs 11 and 12.

Gears 75 are keyed on shaft 72 to rotate therewith. The beveled faces 76 on said gears 75 are opposed and are each rifled with an arc 76a of gear teeth. Intermediate gears 75 are two-gear boxes 77. The boxes 77 are rotatively disposed upon shaft 72 by virtue of bearings 78. The bearings 78 are coextensive with the space between beveled gears 75. Immediately above bearings 78 and normal thereto are bearings 79, carrying a spindle 80 on which is keyed a pinion 81. Pinion 81 engages gear teeth 76a, and coacts with a collar 82 to retain the journaled position of the stub shaft 80.

A flat leaf like member or spade 83 is riveted or otherwise fastened to spindles 80 and placed exactly over the recesses 19a in cups 19. The edge periphery of spades 83 is such as to comb the inner walls of cavities 19a when rotated about the axis of shaft 80.

Lugs 84 and 85 are placed at a ninety degree interval on bearings 78 to collide with a cross piece 86 on boss 87 secured to frame member 15. Limited rotative movement of sleeves 78 about shaft 72 is thereby attained. The inner and extended end of stems 80 strike abutment 69 simultaneously with the contacting of lugs 84 with stop 86 to thus carry the weight of the spindles and eliminate the shock otherwise absorbed by said lugs.

A small gear 88 is keyed to shaft 72 and contiguous to the bearing 73 near the forward side of the machine. An off-set sleeve 89 coacting with a set screw 90 serves to prevent axial displacement of pinion 88. Below the assembly just described and attached to leg 11 of the machine is a guide standard 91 functioning to keep the teeth of a rack 92 in mesh with those of the pinion 88 (see Figure 2).

Feathered to the main drive shaft 93 of the machine is a cam 94 shown in cross-section to reveal the eccentric groove 95 in the side thereof. The bottom end of rack 92 is articulated ninety degrees to be welded or otherwise suitably attached to cam followed plate 96. A lug 97 at the upper end of the plate rides in groove 95. The back of plate 96 is in abutment with a washer 98 which is disposed upon shaft 93 adjacent bushing block 99. Thus lug 97 is confined in the eccentric race 95. No claim here is made to the specific means per se for operating the scavenging means 83 or to the scavenging means per se, since such matter is claimed in an application filed by me on January 21, 1935, Serial No. 2620.

As has been recited, the fruit cups 19 as they arrive at station C contain halved fruit with the flat surface upwardly exposed, and with the peeling pared therefrom but lying thereunder. When the receptacles 19 are first positioned at C, the coring plate 40 is in some such position as indicated in dotted outline at A in Figure 3.

The rack 92 is drawn downward by the cam follower 96 through power received from the main drive shaft 93. Further downward motion of the rack rotates shaft 72 and hence shaft 25 because of the coaction of pinions 70 and 71. By a downward movement of the rack 92, the latter named shaft 25 is rotated in a clockwise direction as viewed in Figure 3.

As shaft 25 rotates in a clockwise direction, bevel gear wheels 26 turn likewise as do sleeves 30. The flat face of plate 40 is brought into contact with the exposed pear face, and simultaneously lug 55 engages stop 57 and the end of spindle 32 is engaged by cross arm 67. However, the shaft 25 and the gears 26 continue to rotate in the same direction. Reference to Figure 3 will disclose that further rotation of shaft 25 will turn the spindle 32 and fruit contacting and turning member 40 in a clockwise direction as viewed from the right end of Fig. 3 while the pinion 45, the stem 44 and hence the blade 47 will be revolved in a counter-clockwise direction.

Turning of the spindle 32 while it is in a horizontal position rotates the halved fruit 100 within the pocket 19a as illustrated in Figure 4. It is noted that the fruit 100 is securely held in the cavity 19a of the cup 19, which at this time is immovably held, by the plate 40 while blade 47 cuts into said fruit. While the blade 47 rotates one hundred eighty degrees, the spindle 32 also rotates one hundred eighty degrees. When the blade 47 lies within the cavity provided in block 40, rotation of the block one hundred eighty degrees will invert it, likewise a rotation of the blade one hundred eighty degrees in the opposite direction will again place the blade within the cavity and the relative position will be the same. Therefore, in the present case when the flat fruit holding and turning member 40 is placed flatly against the fruit 100 in receptacle 19 and rotated one hundred eighty degrees, the fruit is rooted from the receptacle and is caused to lie upon the flat member for support. Meanwhile, the coring blade has been rotated one hundred eighty degrees to sever the core 101 from the fruit 100 and to again lie within the central cavity of the block and to leave the core lying loosely in the halved pear. At the close of the operation the fruit and separated core are upon the upper flat face of member 40, and the peeling is in the cup previously occupied by peeling, fruit and integral core.

When bevel gear 26 has turned sufficiently to operate the coring knife and spindle each one hundred eighty degrees and in the manner just described to concurrently core the half fruit and lift such half from the cup, the rack reverses its movement to rotate gear 26 in an anti-clockwise direction. The frictional engagement of shaft 44 with bearing 33 is such that the pinion 45 and shoulder 34 do not rotate, therefore the fruit and core and coring instrumentality are carried upwardly and about shaft 25 approximately ninety degrees until spur 56 strikes stop 57. The sudden stoppage of the spindle incident thereto dislodges the fruit 100 and core 101 therefrom as shown in dotted outline in Figure 3. The fruit falls clear of the device or upon the angular apron 102 provided for that purpose and fastened to the frame member 14 by screws 103. The fruit when falling in the apron 102 slides from the platform to a water or belt conveyor (not shown).

As soon as lug 56 strikes the boss 57, the sleeve 31 is held stationary while gear 26 rotates counter-clockwise to move pinions 45 and 35 one hundred eighty degrees each to thus turn the flat face of member 40 into position to engage a fruit which has been delivered to the station C in another cup (or cups) while the dumping process just described has been conducted. The newly delivered fruit is then cored and dumped in the same manner as above described.

Peel 104 of the fruit was left in the cup cavity 19a when the fruit was removed from the cup incident to the coring operation. The intermittent rotary motion of the turret 16 on which the fruit cups are mounted causes the fruit cups containing the peels to be conducted away from the coring station C, and the device is arranged to bring the cups containing such epidermis to position D. As the cups 19 arrive at station D, the spindles 80 are in elevated position. These spindles are then rotated downwardly by the coaction of rack 92 (which has just started its downward half cycle) and shaft 72 which latter is thereby rotated in a counter-clockwise direction as viewed from the front in Figure 1.

Continued rotation of the shaft 72 brings spindles 80 to abut upon the cross arm 69 and simultaneously lugs 84 abut against the stop 86. The further rotation of the compound blocks 77 with the shaft 72 is thus prevented. However, the beveled gears 76 which are keyed to the shaft 72 continue to turn with the teeth 76a thereon engaging pinions 81 rotating spindles 80. Hence the wings 83 are rotated in the cup cavities 19a to scrape the peel from the cup 19. The rack 92 ceases in its downward movement when the wings 83 have turned one hundred eighty degrees during which the wings have brushed the peel from the cups 19. Such peels are temporarily disposed upon the then top face of the wings. At that time, the rack reverses its movement to rotate the shaft 72 and block 77 clockwise, thereby lifting stems 80 from the support 69 without rotating the flaps or wings 83 with the result that the peels are transported upwardly by said flaps.

A ninety degree rotation of the sleeves 78 brings the lugs 85 against the bar 86 to prevent further turning of the bearing blocks 77. The sudden stoppage of the scavenging devices 83 dislodges the pear skins therefrom, the peelings falling upon a conveyer or discharge chute (not shown) or upon the platform 105 at an angle to the horizontal and covering the gears 75. Such platform 105 extends between the sides 106 which are shown in Figure 1, and whatever peeling falls thereon will eventually slide onto the discharge conveyer or fall into the discharge chute. Side members 106 are secured to the transverse frame member 15 by means of screws 107.

After pins 85 strike bar 86, the rack 92 continues in its upward movement to cause gears 75 to rotate pinions 81 and the wings 83, one hundred eighty degrees before the next downward stroke to carry the spindle 80 in registry with the succeeding pair of cups.

Since shafts 25 and 72 are operated from the identical source of power, the stems 32 and 80 may be made to rise and fall in unison or in timed relation. One may be made to operate at greater speed than the other by changing the gear ratios. The cam driving the cam follower 96 is fixed at a given rotative position on main operating shaft 93 so that the coring devices and peel scavenging instrumentalities operate on material within the cups 19 while the turret is at a standstill, and abduct the fruit and peels respectively therefrom intermediate successive progressive quadrantal shifts of the spider 16.

The present device for removing the core from a fruit has advantages over preceding coring equipment in that it is exceptionally rugged of construction and exceedingly simple of structure for a device performing a task so arduous. It has the added advantage of effectively coring the fruit and removing the threads extending therefrom to the blossom and stem ends of the fruit.

What is claimed as new and is desired to be secured by Letters Patent of the United States, is:

1. A fruit discharging device comprising, in combination, a support rotatable about an axis, a pad arranged for non-positive movement with said support about such axis, said pad being rotatable about an axis at an angle to the first mentioned axis, means displacing said pad and support through a predetermined arc about the first axis, means precluding movement of said pad beyond the limit of such arc while said support rotates relatively thereto, and means causing the pad to rotate about the second axis during relative movement of said pad and support about the first axis.

2. The combination with a receptacle for receiving a half fruit, of means for discharging the half fruit from said receptacle, said discharge means comprising a member having a flat section movable into registry with said receptacle with such flat section parallel to the plane of the mouth of said receptacle and engaging with the flat cut face of the half fruit, and means operable after such registry for rotating said member about an axis in the plane of the cut face of the half fruit with the edge of said member in spaced relation to said receptacle.

3. The combination of a cup for a half fruit having a plane, cut face, of apparatus for treating the fruit in said cup, and a member for holding such fruit in said cup during treatment, the holding member having a fruit engaging section with a face for contacting the plane face of the half fruit, such contacting face having an area less than the area of the mouth of said cup and said holding member being rotatable on an axis diametric of said cup to discharge the fruit therefrom.

4. In combination, a dished receptacle adapted to hold a half fruit having a flat cut face, means for discharging the half fruit from said dished receptacle comprising a member having a flat face, and means for rotating said member on an axis lying in the plane of the flat face of said member diametric of the fruit and with the flat face of said member contacting with the cut face of the half fruit during turning of said member.

5. In combination, fruit holding means for a half fruit having a flat, cut, sticky face, shiftable fruit discharging means having a flat face engaging the flat face of a fruit in said holding means, said discharging means being shiftable to discharge the fruit from said holding means, means for actuating said discharging means, and means for overcoming the adhesion of the fruit to said discharging means after the discharge of such fruit from the holding means.

6. In combination, a fruit cup to receive a half fruit with its plane surface uppermost, a pad having a flat portion adapted to engage the cut face of the half fruit therein, a support for said pad and on which said pad is shiftable, means for moving said pad from a position removed from the face of said cup to a second position with the axis of said cup and the axis of said pad substantially coincident, and means for rotating said pad in either of said positions.

7. A seed severing device comprising means mounted for rotation and contacting the cut face of a half fruit, seed severing means rotatable about the axis of rotation of said fruit contacting means, and means for causing the simultaneous rotation in opposite directions of said fruit contacting means and said seed severing means about their common axis.

8. In combination, an intermittently rotatable conveyor, a fruit holder mounted upon said conveyor, and adapted to hold a fruit with its peeling severed therefrom, a fruit coring instrumentality having parts rotatable about an axis normal to the axis of said conveyor and engaging such fruit while said conveyor is stationary, said coring instrumentality discharging the fruit from said holder and removing the core therefrom, and a fruit peeling removing instrumentality having parts rotatable about an axis normal to the axis of said conveyor.

9. A coring device comprising a rotatable pad adapted to engage the flat surface of a half fruit, there being a core receiving recess in said pad, a coring blade having a cutting edge and journalled within said recess for arcuate movement, out of said recess about an axis extending diametrically of said recess, means for imparting rotary movement to said blade, and means for rotating said pad about its axis.

10. In combination, means for holding a half fruit with the peeling severed therefrom and underlying the half fruit in the receiving means, means for coring the half fruit, and means for substantially inverting the half fruit and discharging the same together with the core from the receiving means.

11. In combination, means for holding a half fruit with its face exposed, means adapted to contact the exposed face of the half fruit to turn the half fruit in the holding means, and means for coring the half fruit while so held, said contacting means including means for retaining the severed core and for discharging said core from the fruit holding means.

12. In combination, means for holding a half fruit with its face exposed, means adapted to contact the exposed face of the half fruit to turn the half fruit in the holding means, and means for coring the half fruit while so held, said contacting means including means for retaining the core and for discharging the core and cored fruit from the holding means.

13. Fruit treating apparatus comprising a recessed holder for receiving and holding a half fruit with the peeling severed therefrom and encompassing the half fruit in the holding means and fruit discharging means having portions adapted to contact the cut face of the fruit, said portions being substantially spaced from the inner surface of the recessed holding means, and means for turning the fruit contacting means relative to the recessed holder for bodily turning the fruit in the recessed holder while leaving the peeling in the original position.

14. Fruit treating apparatus comprising a cup to receive a half fruit with the peeling severed therefrom and encompassing the half fruit in the cup, a fruit discharging member adapted to overlyingly contact the cut face of the fruit at portions spaced inwardly from the marginal edges of the fruit, and means for turning the fruit contacting member to substantially invert the fruit while leaving the severed peeling in the cup.

15. In a fruit treating apparatus the combination of fruit holding means, a cutting station and a peel scavenging station, means for moving the holding means to the cutting station and thence to the peel scavenging station, said holding means being adapted to receive a half fruit with the peel severed therefrom and encompassing the half fruit in the holding means, means at the cutting station for severing the seed section from the half fruit and means for contacting the cut face of the half fruit at portions removed from its marginal edges to substantially invert the half fruit, leaving the peeling lying in the holding means, means for discharging the seed and seeded half fruit from the holding means, and means at the peel-scavenging station for subsequently discharging the peeling from the holding means.

16. In a fruit treating apparatus the combination of a recessed holding means adapted to receive and hold a half fruit with its cut face uppermost, fruit discharging means comprising a member adapted to contact the cut face of the half fruit and to sweep through the recessed holding means, and actuating means disposed wholly at one side of the cup for both sweeping the discharging means through the cup and for thereafter bodily moving the discharging means away from the cup.

17. In a fruit treating apparatus the combination of a recessed fruit holder, a fruit pad adapted to overlie the recessed fruit holder and to extend substantially diametrically thereof and actuating means wholly at one end of said contacting means for turning the same arcuately and for swinging the same away from the fruit holding means.

18. In combination, means forming a recessed fruit holder adapted to hold a half fruit with its cut face exposed, turnable means adapted to be positioned into contact with the cut surface of the fruit in a manner to cause the sticky surface of the half fruit to adhere thereto, and means for turning the turnable means about an axis lying substantially parallel to the cut face of the half fruit to move the adhering cut fruit substantially out of the fruit holder.

19. In combination, means providing a recessed fruit holder adapted to receive a half fruit with its cut face exposed, means adapted to be moved relatively to the fruit holder and including a surface adapted to be contacted with the substantially sticky cut face of the half fruit, and means for shifting said second-named means relatively to the fruit holder while said half fruit is adhered thereto to shift the half fruit relatively to the fruit holder and to a position substantially discharged from the fruit holder.

20. In combination, means providing a recessed fruit holder adapted to receive a half fruit with its cut face exposed, means turnable about an axis substantially parallel to the cut face of the half fruit and including a flat surface, means for pressing the flat surface into contact with the cut surface of the half fruit whereby the stickiness of the half fruit causes its adhesion to the flat surface, and means for turning the flat surface whereby to substantially invert the fruit relatively to the recessed fruit holder.

21. In combination, a fruit holder adapted to receive a half fruit with its cut face exposed, means shiftable relative to the fruit holder including a flat surface adapted to be pressed into adhering contact with the cut face of the half fruit, means for shifting the shiftable member relative to the fruit holder to remove the half fruit from the fruit holder.

22. In combination, recessed means for receiving and holding a half fruit with the peeling severed therefrom but encompassing the half fruit, and fruit discharging mechanism comprising means extending diametrically of the mouth of the receiving means, and including portions adapted to contact the cut face of the half fruit, said means being rotatable relatively to the recessed means and relatively to the encompassing peeling for discharging the fruit from its receiving and holding means and from its peeling, leaving the peeling in the receiving and holding means.

23. In combination, recessed means for holding a half fruit with the peeling severed therefrom and encompassing the half fruit in the holding means, means for coring the fruit while so held, and means for turning the fruit relatively to its peeling while the peeling is in the cup for discharging the cored fruit and core from the holding means leaving the peeling in the holding means.

24. In a machine for treating half fruit, the combination of main holding means for holding a half fruit with its cut face exposed, auxiliary fruit holding means having portions adapted to contact the cut face of the half fruit on opposite sides of the seed-containing section at the cut face of the half fruit, said auxiliary holding means having an opening adapted to register with the seed-containing section of the half fruit, seed severing means operable in said opening and movable about an axis substantially parallel with the cut face of the half fruit during the seed severing operation to cut through the flesh of the half fruit around the seed-containing section to sever the same and embracing the severed seed section upon completion of the severing operation, means for relatively shifting the main and auxiliary fruit holding means to position the auxiliary fruit holding means in contact with the cut face of the half fruit, means for actuating the seed severing means to cause the same to sever the seed section and to embrace the severed seed section upon completion of the severing operation, and means for thereafter relatively shifting said main fruit holding means and said seed severing means to remove the severed seed section from said main fruit holding means.

25. In a machine for treating half fruit, the combination of main holding means for holding a half fruit with its cut face exposed, auxiliary fruit holding means having portions adapted to contact the face of the half fruit on the opposite sides of the seed-containing section at the cut face of the half fruit, said auxiliary holding means having an opening adapted to register with the seed-containing section of the half fruit, seed severing means operable in said opening, said seed severing means comprising a single cutter of curvilinear configuration to embrace the severed seed section upon completion of the severing operation, means for relatively shifting the main and auxiliary fruit holding means to position the auxiliary fruit holding means in contact with the cut face of the half fruit, means for actuating the seed severing means to cause the same to sever the seed section and to embrace the severed seed section upon completion of the severing operation, and means for thereafter relatively shifting said main fruit holding means and said seed severing means to remove the severed seed section from the main fruit holding means.

26. In a machine for treating half fruit, the combination of main holding means for holding a half fruit with its cut face exposed, auxiliary fruit holding means having portions adapted to contact the face of the half fruit on the opposite sides of the seed containing section at the cut face of the half fruit, said auxiliary holding means having an opening adapted to register with the seed containing section of the half fruit, seed severing means operable in said opening, said seed severing means comprising a single cutter of curvilinear configuration to embrace the severed seed section upon completion of the severing operation, and actuating mechanism including means for relatively shifting the main and auxiliary fruit holding means toward each other to position the auxiliary fruit holding means in contact with the cut face of the half fruit, said actuating mechanism including means for actuating the seed severing means to cause the same to sever the seed section and to embrace the severed seed section upon completion of the severing operation, and said actuating mechanism including means for thereafter relatively shifting said main fruit holding means and said auxiliary fruit holding means away from each other and simultaneously shifting said main fruit holding means and said seed severing means to remove the severed seed section from the main fruit holding means.

27. In a fruit treating machine, the combination of a turret provided with a plurality of spaced apart main fruit holding means adapted to receive and hold halves of fruit with their cut faces exposed, said turret successively positioning said main fruit holding means at a predetermined station, auxiliary fruit holding means shiftably mounted at said station and having a surface adapted to contact the cut face of each half fruit at the station, said auxiliary fruit holding means having an opening therein adapted to register with the seed-containing section of the half fruit, power actuated means for intermittently operating said turret and including means for automatically shifting said auxiliary fruit holding means into contact with the cut face of the half fruit with its opening registering with the seed section of a half fruit when positioned at said station, shiftably mounted seed severing means adapted to operate in the opening of said auxiliary fruit holding means and movable about an axis substantially parallel with the cut face of a half fruit at said station during the seed severing operation to cut through the flesh of the half fruit around the seed-containing section to sever the same and to embrace the severed seed section upon completion of the severing operation, said power actuated means including means for shifting said seed severing means toward a fruit holding means at said station to contact the cut face of the half fruit when the same is contacted by the surface of the auxiliary fruit holding means, said power actuated means including means for actuating the seed severing means to cause the same to sever the seed section and to embrace the severed seed section upon completion of the severing operation, and means included in said power actuated means for thereafter shifting said auxiliary fruit holding means and said seed severing means away from the main fruit holding means at said station to remove the severed seed section embraced by the seed severing means and to permit the subsequent intermittent movement of the turret.

MARK EWALD.